United States Patent [19]
Hickman

[11] Patent Number: 5,501,257
[45] Date of Patent: Mar. 26, 1996

[54] TREE TRIMMING APPARATUS

[76] Inventor: Lewis L. Hickman, 1921 Still Oaks Dr., Montgomery, Ala. 36117-2435

[21] Appl. No.: 398,804

[22] Filed: Mar. 6, 1995

[51] Int. Cl.[6] .............................. A01G 23/00; B27L 1/00
[52] U.S. Cl. .............................. 144/2 Z; 56/10.1; 56/235; 30/379.5; 83/928; 144/335; 144/343
[58] Field of Search .............................. 56/233, 234, 235, 56/10.1; 83/928; 30/379, 39.5; 144/2 Z, 3 D, 343, 335

[56] References Cited

U.S. PATENT DOCUMENTS

| | | | |
|---|---|---|---|
| 4,522,239 | 6/1985 | Gaitten | 144/2 Z |
| 4,569,379 | 2/1986 | Gemmell-Murdoch | 144/2 Z |
| 5,378,852 | 1/1995 | Manor | 144/343 |
| 5,390,715 | 2/1995 | Luscombe | 144/343 |
| 5,441,090 | 8/1995 | Hill et al. | 144/2 Z |

*Primary Examiner*—W. Donald Bray
*Attorney, Agent, or Firm*—Lalos & Keegan

[57] ABSTRACT

A tree trimming apparatus connectable to an operating arm generally including a first housing connectable to the operating arm, a first shaft journaled in the first housing and rotatable about a first axis, means mounted on the first housing and operatively connected to the first shaft for rotating the first shaft about the first axis, a second housing mounted on the first shaft, a second shaft journaled in the second housing and rotatable about a second axis disposed at an angle relative to the first axis, means mounted on the second housing and operatively connected to the second shaft for rotating the second shaft about the second axis, a third housing mounted on the second shaft, at least a third shaft journaled in the third housing and rotatable about a third axis disposed parallel to the second axis, the third shaft having severing means disposed thereon and rotatable therewith and means mounted on the third housing and operatively connected to the third shaft for rotating the third shaft about the third axis.

29 Claims, 5 Drawing Sheets

TREE TRIMMING APPARATUS

This invention relates to a tree trimming apparatus and more particularly an aerial type of trimming apparatus which may be operated at ground level and manipulated to trim tree limbs in the vicinity of overhead electrical transmission lines and the like and transferring severed limbs to ground level for further disposition.

In the prior art, there has been developed a number of devices for trimming tree limbs. It has been found, however, that such prior art devices are expense to manufacture, uneconomical to operate, difficult to maneuver and/or ineffective in performance. It has thus has been found to be desirable to provide an improved tree trimming apparatus which obviates such short comings in such devices.

Accordingly, it is the principal object of the invention to provide an improved tree trimming apparatus.

A further object of the present invention is to provide an improved tree trimming apparatus which is comparatively inexpensive to manufacture and relatively economical to operate.

The present object of the present invention is to provide an improved tree trimming apparatus which is easily maneuverable to access difficult to reach areas for trimming tree limbs.

A still further object of the present invention is to provide an improved tree trimming apparatus which may be easily maneuvered for trimming tree limbs located adjacent overhead objects such as electrical transmission lines and the like.

Another object of the present invention is to provide an improved tree trimming apparatus which is maneuverable for grasping tree limbs in close proximity in overhead objects such as electrical transmission lines, severing such limbs and then transferring the severed limbs to ground level for further disposition thereof.

A further object of the present invention is to provide a highly maneuverable tree trimming apparatus which may be operated from ground level.

A still object of the present invention is to provide an improved tree trimming apparatus which is simple in design, readily accessible for servicing and easily maintained and serviced.

Other objects of the present invention will become more apparent to those persons having ordinary skill in the art to which the present invention pertains from the following description taken in conjunction with the accompanying drawings wherein:

Figure 1:
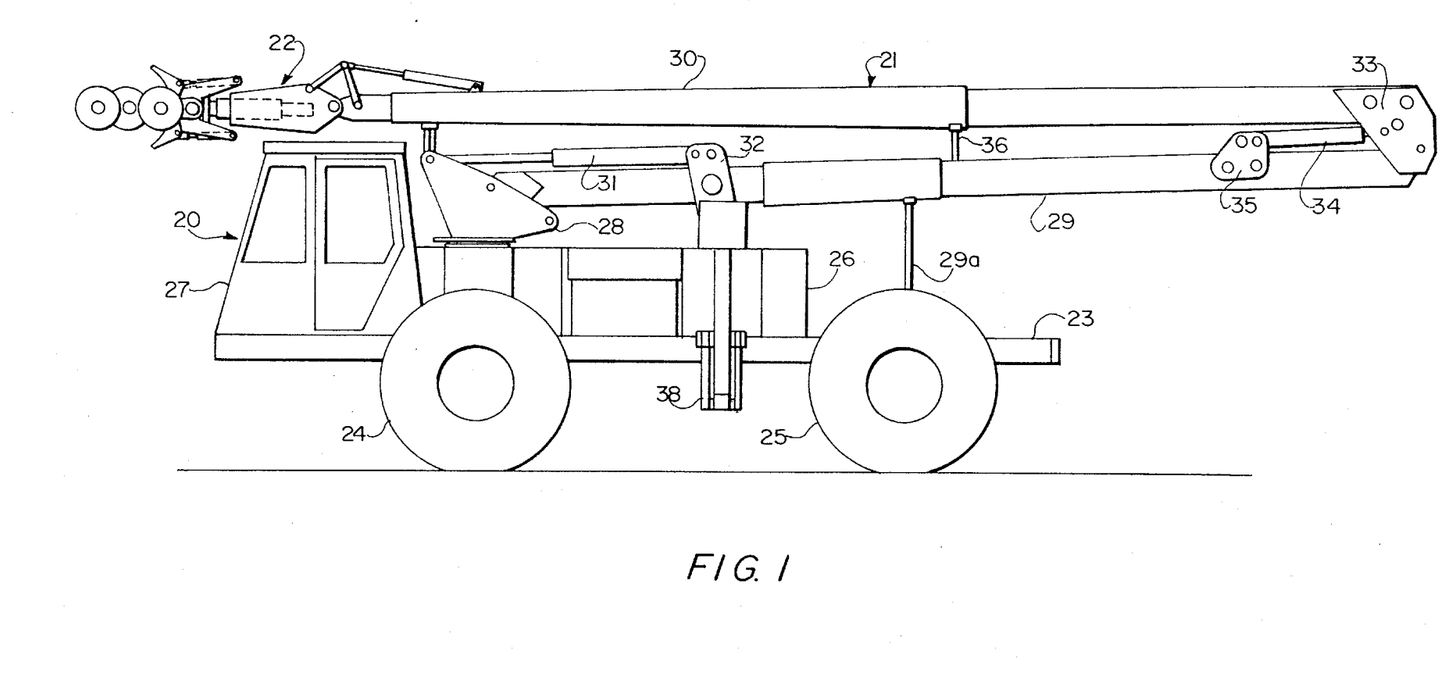
FIG. 1 is a side elevational view of a mobile unit embodying the present invention.
Figure 2:
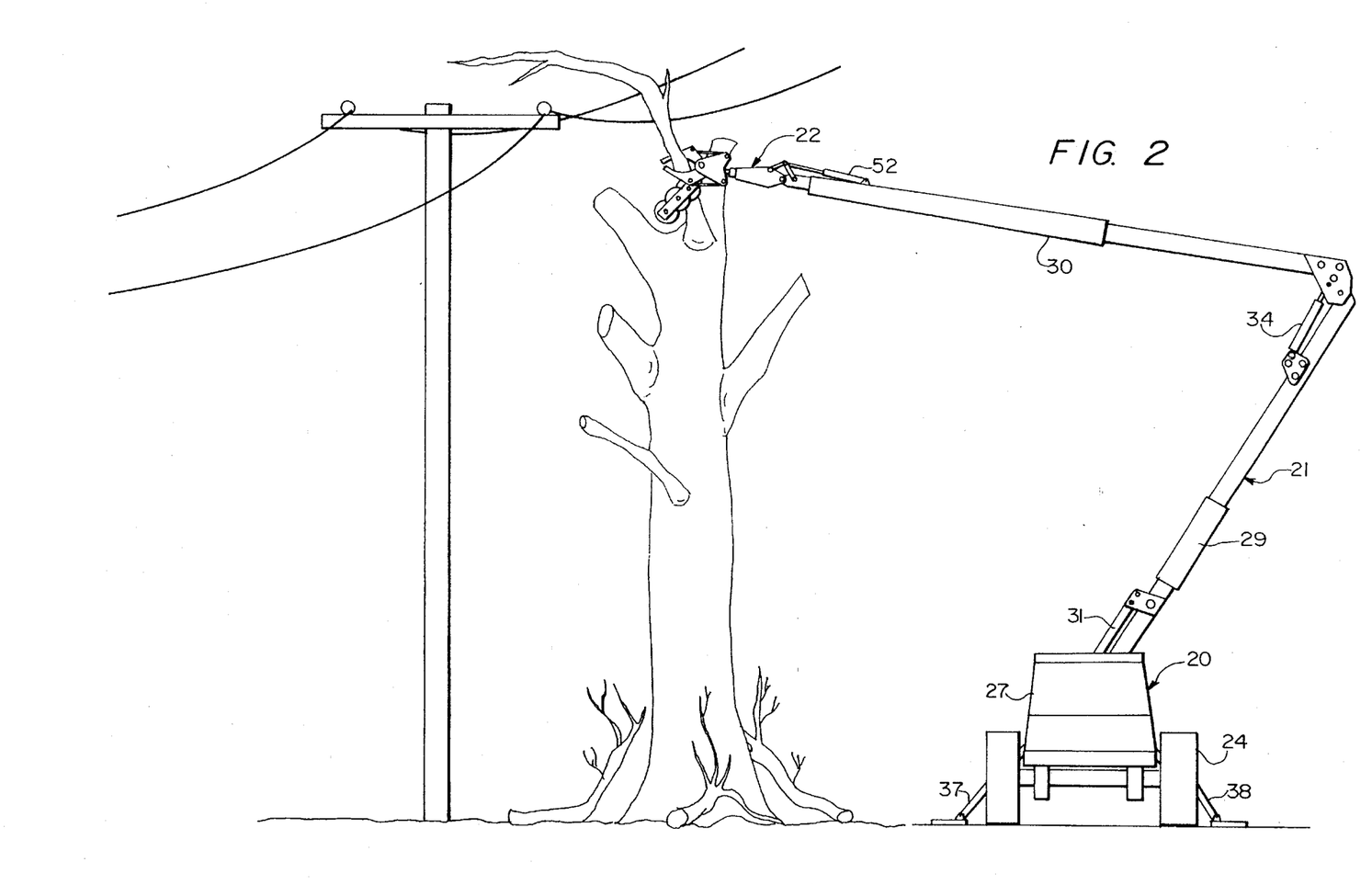
FIG. 2 is an end view of the unit shown in FIG. 1, illustrating its manner of use in trimming a tree limb disposed adjacent an overhead electrical transmission lines.
Figure 3:
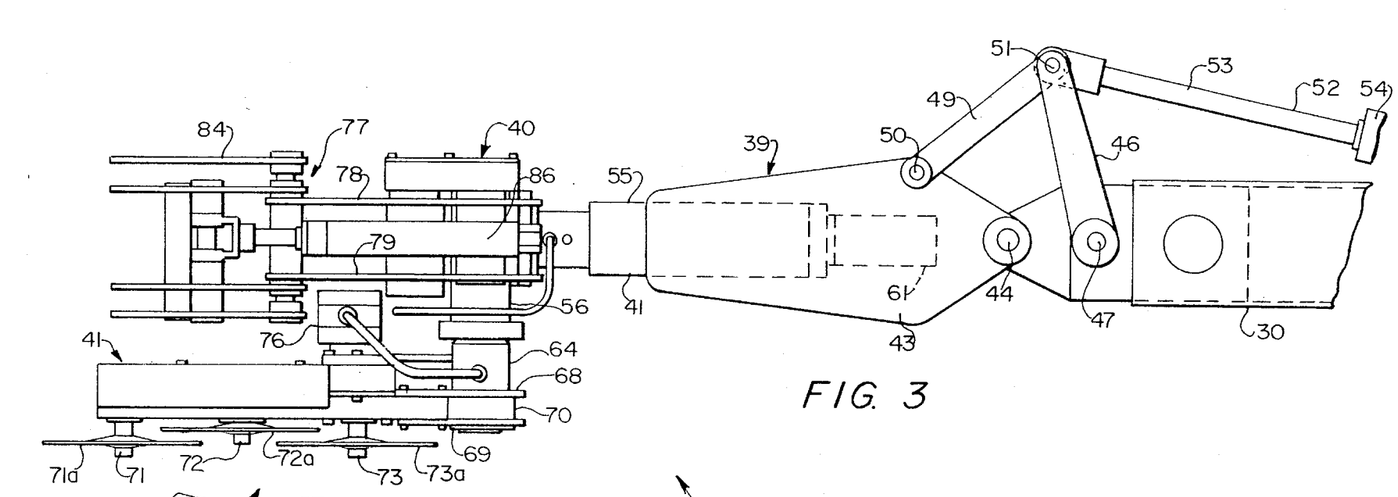
FIG. 3 is an enlarged, side elevational view of the tree trimming apparatus of the unit shown in FIGS. 1 and 2.

Referring to FIGS. 1 and 2, there is illustrated a mobile unit embodying the present invention which generally consists of a vehicle 20, a boom assembly 21 mounted on the vehicle and a tree trimming apparatus 22 operatively connected to the free end of the boom. The vehicle is a conventional construction including a chassis 23 mounted on a pair of wheel units 24 and 25, a motor and power plant 26 mounted on the chassis for operating the vehicle, boom assembly and tree trimming apparatus and an operator's cab 27 mounted on the forward end of the chassis and provided with suitable controls for operating the vehicle, boom assembly and tree trimming apparatus.

The boom assembly similarly is of a conventional construction including a pedestal 28, a lower boom section 29 and an upper boom section 30. Pedestal 28 is supported on the chassis and adapted to be rotated about a vertical axis. Lower boom section 29 is pivotally connected at its inner end to pedestal 28 and is adapted to be pivoted about a horizontal axis by means of a hydraulic cylinder assembly 31 operatively interconnecting pedestal 28 and a set of brackets 32 provided on lower boom section 29. Upper boom section 30 is provided with a set of brackets 33 at one end thereof which are pivotally connected to an outer end of lower boom section 29. It is adapted to pivot relative to the lower boom section by means of a hydraulic cylinder assembly 34 operatively interconnecting a set of brackets 35 mounted on lower boom section 29 and brackets 33.

With the boom assembly in the collapsed or retracted condition as shown in FIG. 1, lower boom section 29 is adapted to be supported on a support member 29a and upper boom section 30 is adapted to be supported on a support member 36 provided on the lower boom section. In such condition, the boom assembly will be nestled along the chassis of the vehicle with the tree trimming apparatus disposed above and just immediately ahead of the cab portion of the vehicle to facilitate the transportation of the unit from one working site to another. When the unit is transported to a selected working site as shown in FIG. 2, the vehicle is adapted to be stabilized by means of a set of outriggers 37 and 38 mounted on the chassis of the vehicle and displaceable outwardly by hydraulic cylinder assemblies to engage the ground on opposite sides of the vehicle to provide a stable base for extending and manipulating the boom assembly.

Referring to FIGS. 3 through 6, tree trimming apparatus 22 consists a base section 39 pivotally connected to the outer end of upper boom section 30, a support section 40 pivotally mounted on base section 39 and a saw arm section 41 pivotally connected to support section 40. Section 39 includes a housing member 41 provided with a pair of mounting brackets 42 and 43 pivotally connected to upper boom section 30 by means a connecting pin 44. The base section is adapted to pivot about the axis of connecting pin 44 by means a pair of support links 45 and 46 pivotally connected at their lower ends to the outer boom section by means of a connecting pin 47, a pair of swing links 48 and 49 pivotally connected at one set of ends to mounting brackets 42 and 43 by means of a connecting pin 50, and connected at an opposite set of ends to support links 45 and 46 by means of a connecting pin 51 and a hydraulic cylinder assembly 52 provided with a rod portion 53 connected to pin 51 and a cylinder portion 54 pivotally connected to a set of brackets provided on the upper boom section.

Figures 5, 6, 7:
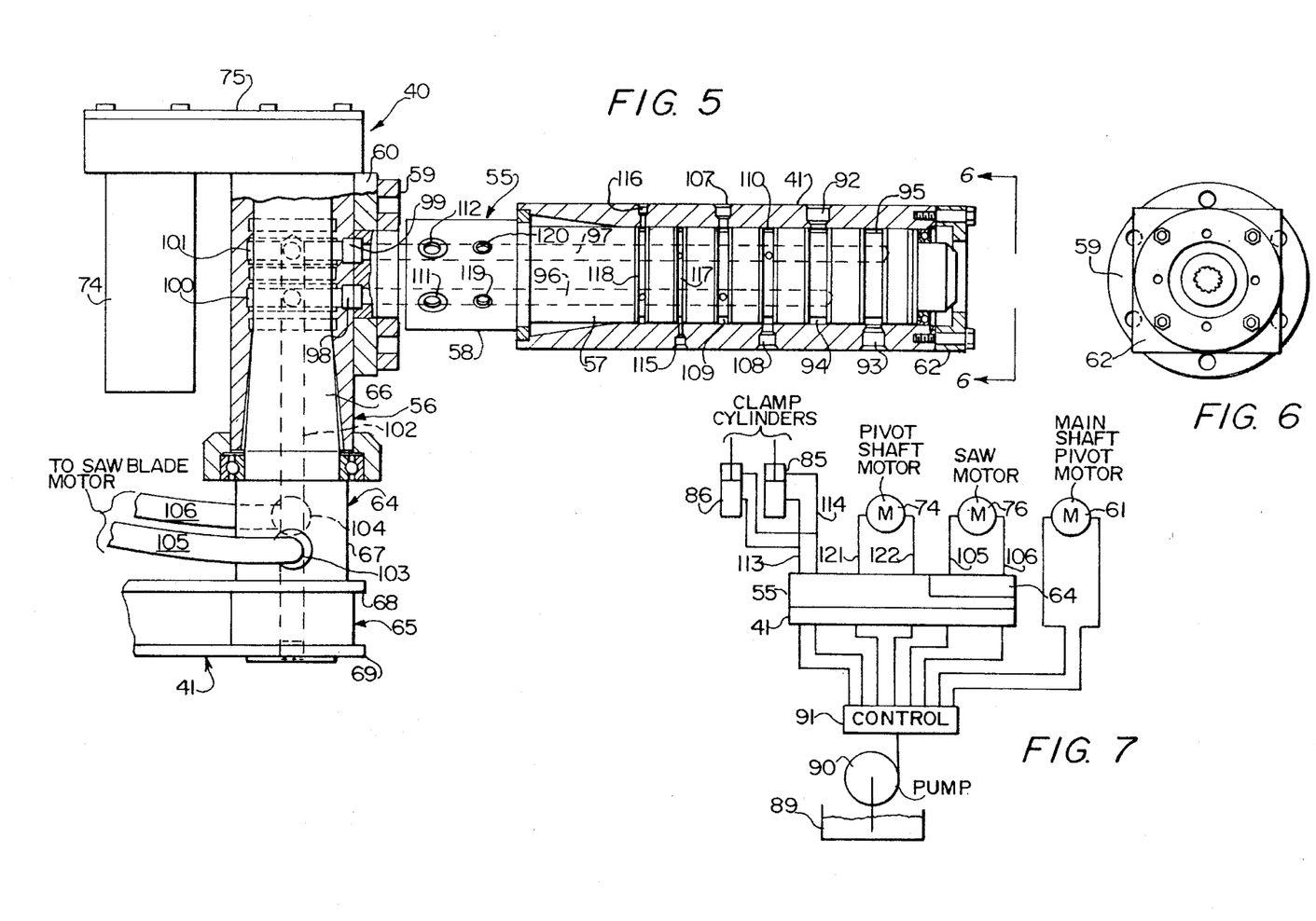
FIG. 5 is an enlarged view of a portion of the apparatus shown in FIG. 3, illustrating various housing components in vertical cross section.
FIG. 6 is a cross sectional view taken along line 6—6 in FIG. 5.
FIG. 7 is a schematic-diagrammatic view of the control system for the apparatus shown in FIGS. 3-through 6.
Figure 8:
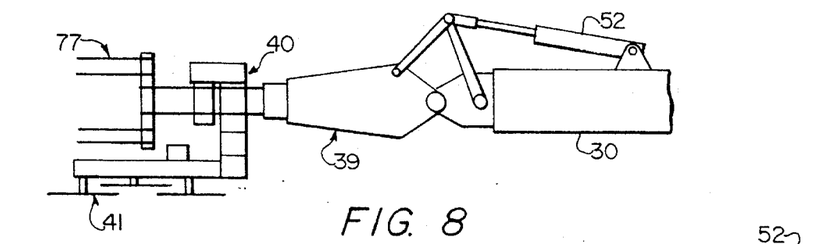
FIG. 8 is a diagrammatic view of the apparatus shown in FIGS. 3 through 6.
Figures 9, 10, 11, 12, 13:
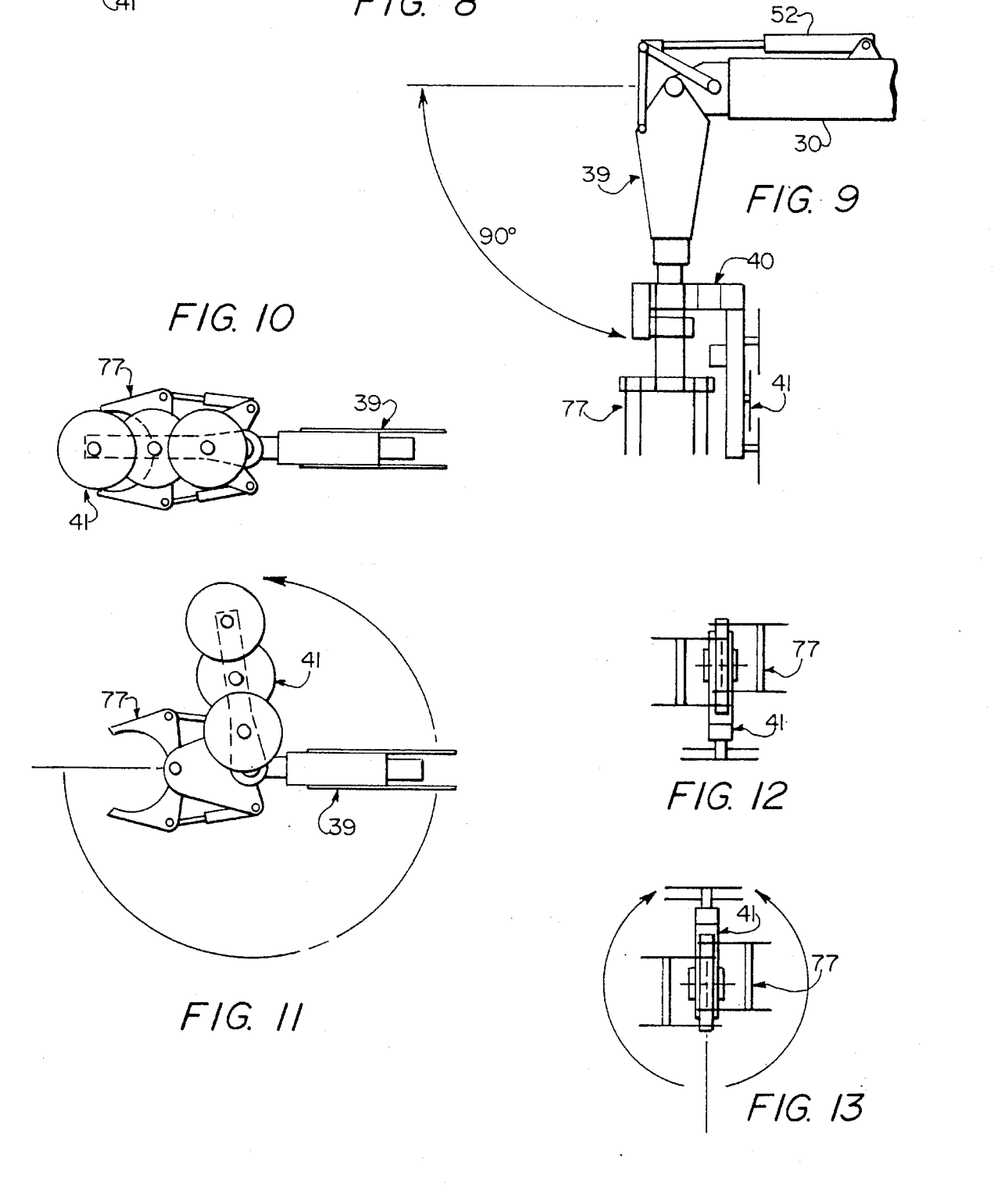
FIG. 9 is a view similar to the view shown in FIG. 8, illustrating the tree trimming apparatus displaced 90° relative to a boom section to which it is pivotally connected.
FIG. 10 is a bottom view of a portion of the apparatus shown in FIG. 8.
FIG. 11 is a view similar to the view shown in FIG. 10, illustrating the 360° freedom movement of the saw arm section of the apparatus.
FIG. 12 is a front elevational view of the apparatus shown in FIG. 8.
FIG. 13 is a view similar to the view shown in FIG. 12 illustrating the 360° freedom of movement of the saw arm section about a different axis.

Support section 40 includes a main shaft 55 and housing member 56. Main shaft 55 has a portion 57 journaled in a housing member 41 so that shaft 55 may rotate about the longitudinal axis thereof, and an external portion 58 secured to housing 56. As best shown in FIGS. 5 and 6, shaft portion 58 is provided with an end plate 59 which is adapted to be rigidly secured to a mounted plate 60 rigidly secured to housing member 56. Support section 40 is adapted to pivot relative to base section 41 about the longitudinal axis of shaft member 55 by means of a fluid actuated, rotary drive motor 61 mounted on an end plate 62 of housing 41 and having an output shaft connected to main shaft 55.

Saw arm section 41 includes a pivot shaft 64 and a housing 65. Shaft 64 is provided with a portion 66 journaled in housing 56 and an outer portion 67 so that pivot shaft 64 is adapted to rotate about its longitudinal axis displaced at a 90° angle relative to the axis of main shaft 55.

Housing 41 is disposed generally radially relative to the axis of pivot shaft 64 and includes a pair of upper and lower wall portions 68 and 69 rigidly secured to the outer end of the pivot shaft and an encompassing side wall 70. Journaled in housing 41 is a set of driven shafts 71, 72 and 73 provided with a set of overlapping circular saw blades 71a, 72a and 73a. The saw arm section is adapted to be rotated about the axis of shaft 64 by means of a fluid actuated, rotary drive motor 74 mounted on a drive housing 75 secured to the upper end of housing 56. Drive is transmitted from drive motor 74 to a pivot shaft 64 by means of a drive sprocket mounted on the output shaft of motor 74, a driven sprocket mounted on the end of pivot shaft 64 and a drive transmitting chain, disposed within drive housing 75.

The circular saw blades are rotated by a fluid actuated, rotary drive motor 76 mounted on housing 65, provided with output shaft 73. Shafts 71, 72 and 73 are provided with sprockets and interconnecting drive chains for transmitting drive from motor output shaft 73 to shafts 71 and 72.

Figure 4:
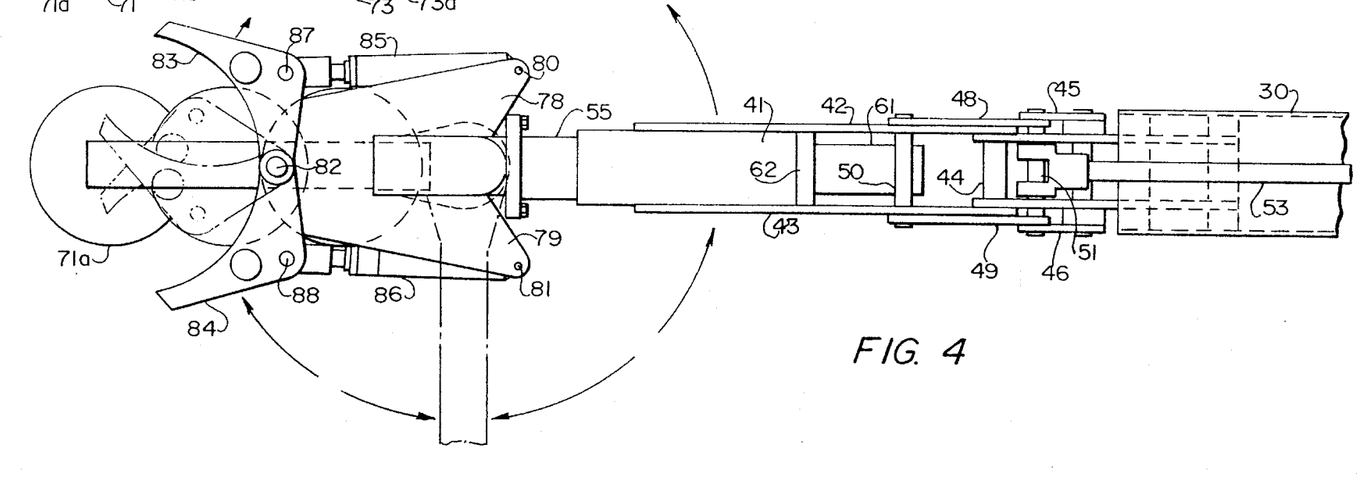
FIG. 4 is a top plan view of the apparatus shown in FIG. 3.

Also mounted on support section 40 is a tree limb clamping assembly 77. Such assembly includes a pair of spaced base blades 78 and 79 rigidly mounted on housing 56 and projecting forwardly therefrom, a set of rearwardly disposed connecting pins 80 and 81 interconnecting the rearward ends of base blades 78 and 79 and a forwardly disposed pivot pin 82 interconnecting the forward ends of the base plates. Connected to pivot pin 82 is a set of clamping jaws 83 and 84 which are adapted to pivot about the axis of pivot pin 82 into open and closed clamping positions as illustrated in FIG. 4. The pivotal action of the clamping arms are provided by a set of fluid actuated cylinder assemblies 85 and 86 having the cylinder portions thereof pivotally connected to connecting pins 80 and 81 and the rod portions thereof pivotally connected to connecting pins 87 and 88 provided on the jaw members. Generally, clamping assembly 77 is disposed substantially radially relative to the axis of pivot shaft 64 and is axially spaced from saw arm section 41 so that a tree branch or limb clamped between jaw members 83 and 84 and extending below and intersecting the plane of movement of saw blades 71 through 73, will be severed as the saw blade support section is pivoted about the axis of pivot shaft 64.

Referring to FIG. 7, there is shown schematically the system for supplying fluid under pressure to operate main shaft drive motor 61, pivot shaft motor 74, saw blade motor 76 and clamping cylinder assemblies 85 and 86. The system includes a fluid reservoir 89 and pump 90 provided on the chassis of the vehicle, a fluid flow control 91, preferably mounted in the operator's cab on the vehicle, a pair of fluid lines running along the boom sections to main shaft drive motor 61, a plurality of fluid lines running along the boom sections and connected to fluid ports provided in housing member 41, passageways, main shaft 55, housing 56 and pivot shaft 64, a plurality of lines interconnecting fluid ports in main shaft 55 and, drive motor 74 and mounting cylinders 85 and 86, and a set of fluid lines interconnecting a set of ports in pivot shaft 64 and drive motor 76. Such passageways for transmitting fluid to and from saw blade motor 76 include a set of fluid ports 92 and 93 in housing 41, a pair of annular grooves 94 and 95 in main shaft 55 registered and communicating with fluid ports 92 and 93, a pair of longitudinally disposed passageways 96 and 97 in main shaft 55 communicating with annular recesses 94 and 95, a pair of fluid ports 98 and 90 in housing 56 intercommunicating passageways 96 and 97 and annular grooves 100 and 101 provided on the inner side of housing 56, a pair of longitudinally disposed passageways 102, 102 in pivot shaft 66 intercommunicating annular grooves 100 and 101 with a set of fluid ports 103 and 104 provided in exterior portions 67 of pivot shaft 64 and a pair of fluid lines 105 and 106 interconnecting fluid ports 103 and 104 with saw blade motor 76. Passageways for transmitting fluid to and from clamping cylinder assemblies 85 and 86 include fluid ports 107 and 108 in housing member 41, annular grooves 109 and 110 in shaft section 57 registered and communicating with fluid ports 107 and 108, longitudinally disposed passageways in main shaft 55 intercommunicating annular grooves 109 and 110 with fluid ports 111 and 112, and fluid lines 113 and 114 intercommunicating fluid ports 111 and 112 and cylinder assemblies 85 and 86. Passageways for providing fluid to and from drive motor 74 include fluid ports 115 and 116, annular grooves 117 and 118 in main shaft 55 registered and communicating with fluid ports 115 and 116, a pair of longitudinally disposed passageways in main shaft 55 intercommunicating annular grooves 117 and 118 and fluid ports 119 and 120 and a pair of fluid lines 121 and 122 intercommunicating fluid ports 119 and 120 and drive motor 74.

From the above description, it will be noted that the axis of pivot pin 44 is disposed perpendicular to the longitudinal axis of up boom section 30 so that upon operation of cylinder assembly 52, the entire tree trimming apparatus will be caused to pivot about pin 44. The axis of main shaft 55 is disposed substantially perpendicularly to the axis of pivot pin 44 so that upon operation of drive motor 61, support section 40 and saw blade arm section 41 as a unit will be caused to rotate relative to base section 39 about the axis of main shaft 55. The axis of pivot shaft 64 is disposed perpendicularly relative to the axis of main shaft 55 and saw blade section 41 is disposed radially relative to the axis of pivot shaft 64 and is spaced from and disposed substantially parallel to the axis of main shaft 55 so that upon operation of drive motor 74, the saw blade section would be free to rotate 360°, clear of base section 39, and clamping assembly 79 is disposed substantially radially relative to the axis of pivot shaft 64 and spaced parallel relative to saw blade section 41 so that when a tree limb is clamped between the jaws of the assembly and projects through the plane of the path of movement of the saw blade section, the pivotal movement of the saw blade section will cause the circular saw blades to engage and sever such projecting portion of the tree limb. It further will be appreciated, as particularly illustrated in FIGS. 8 through 13, that the tree trimming apparatus and its component portions are provided with several degrees of movement to enable the apparatus to be maneuvered and easily access, clasp and sever a tree limb in a number of different positions.

In the use of the invention as described for removing the limb of a tree, perhaps located in the vicinity of an overhead electrical transmission line as shown in FIG. 2, the unit as shown in FIG. 1 is first transported to a location adjacent the tree. With the vehicle properly located, the actuating means for the outriggers are operated to extend, engage the ground and thus provide a stable footing for the vehicle. Controls in the operator's cab are then operated to actuate cylinder assemblies 31 and 34 and a rotary drive for pedestal 28 to position the tree trimming apparatus adjacent the tree limb to be removed. With the saw blade section in a rewarding swung position below the base section, the controls for the boom assembly and tree trimming apparatus are operated to position the trimming apparatus so that the limb to be severed is received between the jaws of the clamping assembly. The controls are then operated to close the clamping jaws thus firmly grasping the tree limb and motor 44 is operated to swing the saw blade section around to cause the saw blades to engage and sever the tree limb held with the clamping assembly. When the tree limb has been severed, the controls may be operated to either open clamping jaws and thus allow the severed tree limb to fall to the ground or maneuver the boom assembly to transport the severed limb to a selected location on the ground.

It further will be appreciated that the invention as described provides not only a simple and compact tree trimming apparatus but also an apparatus which may be easily and effectively positioned through several degrees of movements to access a tree limb to be removed, operated to firmly grip and cleanly sever the limb to be removed and then operated to either release the severed limb permitting it to fall to the ground or transfer the severed limb to a selected position on the ground.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A tree trimming apparatus connectable to an operating arm comprising:

a first housing connectable to said operating arm;

a first shaft journaled in said first housing and rotatable about a first axis;

means mounted on said first housing and operatively connected to said first shaft for rotating said first shaft about said first axis;

a second housing mounted on said first shaft;

a second shaft journaled in said second housing and rotatable about a second axis disposed at an angle relative to said first axis;

means mounted on said second housing and operatively connected to said second shaft for rotating said second shaft about said second axis;

a third housing mounted on said second shaft;

at least a third shaft journaled in said third housing and rotatable about a third axis disposed substantially parallel to said second axis, said shaft having severing means disposed thereon and rotatable therewith; and means mounted on said third housing and operatively connected to said third shaft for rotating said third shaft about said third axis.

2. An apparatus according to claim 1 wherein said rotating means comprise fluid actuated, rotary drive motors.

3. An apparatus according to claim 1 wherein said severing means comprises a circular saw blade.

4. An apparatus according to claim 1 wherein said first housing includes means for pivotally connecting said first housing to said operating arm about an axis disposed at an angle of 90° relative to said first axis.

5. An apparatus according to claim 1 including means mounted on said second housing for clamping a tree limb to be severed.

6. An apparatus according to claim 5 when said clamping means includes a pair of clamping jaws mounted for pivotal movement relative to each other.

7. An apparatus according to claim 6 wherein the pivot axis of each of said clamping jaws is parallel to said second axis.

8. An apparatus according to claim 5 including actuating means for moving said clamping jaws into and out of closed and open positions.

9. An apparatus according to claim 6 including a pair of hydraulic cylinder assemblies each operatively interconnecting said second housing and one of said clamping jaws.

10. An apparatus according to claim 1 including a plurality of shafts journaled in said third housing, each having a severing means disposed thereon and driven by said third mentioned rotating means.

11. An apparatus according to claim 10 wherein each of said severing means comprises a circular saw blade.

12. An apparatus according to claim 11 wherein adjacent circular saw blades are disposed in overlapping relations.

13. An apparatus according to claim 1 wherein said third housing is spaced sufficiently from said first housing to permit said third housing to be rotated 360° about said second axis.

14. An apparatus according to claim 1 wherein said third housing is rotatable about said second mentioned axis in a plan disposed parallel to said first axis.

15. An apparatus according to claim 6 wherein said clamping jaws are movable in a plane spaced from a plane in which said third housing is rotatable to allow a tree limb held by said clamping jaws to be engaged and severed by said severing means rotating about said second axis.

16. An apparatus according to claim 6 wherein said clamping means are movable in a plane disposed perpendicular to said second axis, and are displaced relative to a plane in which said third housing is rotatable about said second axis.

17. An apparatus according to claim 6 wherein said clamping jaws are pivoted about an axis spaced from and disposed parallel to said second axis.

18. An apparatus according to claim 1 wherein said third mentioned rotating means comprises a fluid actuated, rotary drive motor and said first and second housings and said first and second shafts include passageways for conducting fluid between a set of ports in said first housing and a set of ports in said second shaft, and including fluid lines interconnecting said second mentioned set of ports and said rotary drive motor.

19. An apparatus according to claim 18 wherein said passageways include a pair of annular grooves in said first shaft, each communicating with one of said first mentioned set of ports in said first housing, and a pair of annular grooves in said second housing, each communicating with one of said second mentioned set of ports in said second shaft.

20. An apparatus according to claim i wherein said second mentioned rotating means comprises a fluid actuated, rotary drive motor and said first housing and said first shaft include passageways for conducting fluid between a set of ports on said first housing and a set of ports on said first shaft, and including fluid lines interconnecting said second mentioned set of ports and said rotary drive motor.

21. An apparatus according to claim 19 wherein said passageways include a pair of annular grooves in said third housing, each communicating with one of said first mentioned set of ports in said first housing.

22. An apparatus according to claim 8 wherein said actuating means comprise fluid actuated means and said first housing and said first shaft include passageways for conducting fluid between a set of ports in said first housing and a set of ports and said first shaft, and including fluid lines intercommunicating said second mentioned set of ports and said fluid actuated means.

23. An apparatus according to claim 22 wherein said passageways include a pair of annular grooves in said first shaft, each communicating with one of said first mentioned set of ports in said first housing.

24. A tree trimming assembly comprising:

a pedestal;

a boom operatively connected to said pedestal and;

a tree trimming apparatus comprising a first housing operatively connected to said boom, a first shaft journaled in said first housing and rotatable about a first axis, means mounted on said first housing and operatively connected to said first shaft for rotating said first shaft about said first axis, a second housing mounted on said first shaft, a second shaft journaled in said second housing and rotatable about a second axis disposed at an angle relative to said first axis, means mounted on said second housing and operatively connected to said second shaft for rotating said second shaft about said second axis, a third housing mounted on said second shaft, at least a third shaft journaled in said third housing and rotatable about a third axis disposed parallel to said second axis, said third shaft having severing means disposed thereon and rotatable therewith, and means mounted on said third housing and operatively connected to said third shaft for rotating said third shaft about said third axis.

25. An assembly according to claim 24 wherein said pedestal is supported on a base member and rotatable about a vertical axis.

26. An assembly according to claim 24 wherein said boom includes a lower boom section pivotally connected to said pedestal and an upper broom section pivotally connected to said lower section, and wherein said first housing is pivotally connected to upper broom section, and including means for pivoting said lower boom section relative to said pedestal, means for a pivoting said upper boom section relative to said lower boom section and means for pivoting said first housing relative to said upper boom section.

27. A tree trimming unit comprising:

a vehicle;

a pedestal mounted on said vehicle;

a boom operatively connected to said pedestal and;

a tree trimming apparatus comprising a first housing pivotally connected to said boom, means operatively interconnecting said boom and said first housing for pivoting said housing relative to said boom, a first shaft journaled in said first housing and rotatable about a first axis, means mounted on said first housing and operatively connected to said first shaft for rotating said first shaft relative to said first housing about said first axis, a second housing mounted on said first shaft, a second shaft journaled in said second housing and rotatable about a second axis disposed at an angle relative to said first axis, means mounted on said second housing and operatively connected to said second shaft for rotating said second shaft about said second axis, a third housing mounted on said second shaft, at least a third shaft journaled in said third housing and rotatable about a third axis disposed parallel to said second axis, said third shaft having severing means disposed thereon and rotatable therewith and means mounted on said third housing and operatively connected to said third shaft for rotating said third shaft about said third axis.

28. A unit according to claim 27 wherein said pedestal is supported on a base member and is pivotal about a vertical axis.

29. A unit according to claim 27 wherein said boom includes a lower boom section pivotally connected to said pedestal and an upper boom section pivotally connected to said lower boom section, and said first housing is pivotally connected to said upper boom section, and including means for pivoting said lower boom section relative to said pedestal and means for pivoting said upper boom section relative to said lower boom section.

* * * * *

UNITED STATES PATENT AND TRADEMARK OFFICE
Certificate

Patent No. 5,501,257                                                                                     Patented: March 26, 1996

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Lewis L. Hickman, Montgomery, AL (US); and Philip S. Hutchinson, Montgomery, AL (US)

Signed and Sealed this Thirtieth Day of March 2010.

Dana Ross
*Supervisory Patent Examiner*
Art Unit 3725